US006768131B2

(12) United States Patent
Rüfenacht

(10) Patent No.: US 6,768,131 B2
(45) Date of Patent: Jul. 27, 2004

(54) SEMICONDUCTOR DEVICE WITH GIGANTIC PHOTON-PHOTON INTERACTIONS

(75) Inventor: Mathilde Rüfenacht, Brugg (CH)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/148,244

(22) PCT Filed: Dec. 13, 2000

(86) PCT No.: PCT/US00/33886

§ 371 (c)(1),
(2), (4) Date: May 29, 2002

(87) PCT Pub. No.: WO01/43199

PCT Pub. Date: Jun. 14, 2001

(65) Prior Publication Data

US 2002/0179916 A1 Dec. 5, 2002

Related U.S. Application Data

(60) Provisional application No. 60/170,401, filed on Dec. 13, 1999.

(51) Int. Cl.[7] .............................................. H01L 29/06
(52) U.S. Cl. .......................... 257/14; 257/25; 257/96; 257/98; 372/45
(58) Field of Search ............................ 257/14, 25, 96, 257/98; 372/45

(56) References Cited

U.S. PATENT DOCUMENTS 5,877,509 A * 3/1999 Pau et al.

OTHER PUBLICATIONS

D.S. Chemla et al., "Generation of Ultrashort Electrical Pulses Through Screening by Virtual Populations in Biased Quantum Wells," Phys. Review Lett, 1987, 59(9): 1018–1021.

T.A. Fisher et al., "Electric–Field and Temperature Tuning of Exciton–Photon Coupling in Quantum Microcavity Structures," Phys. Review B., 1995, 51(4): 2600–2603.

T. Fujita et al., "Tunable Polariton Absorption of Distributed Feedback Microcavities at Room Temperature," Physical Review B, 1998, 57(19):428–434.

E. Goobar et al., "Vacuum Field Induced Mixing of Light and Heavy–Hole Excitions in a Semiconductor Microcavity," Appl. Phys. Lett., 1996, 69(23): 3465–3467.

A. Imamoglu et al, "Strongly Interacting Photons in a Nonlinear Cavity," Phys. Review Lett., 1997, 79(8): 1467–1470.

(List continued on next page.)

Fetsum Abraham
(74) Attorney, Agent, or Firm—Gates & Cooper LLP

(57) ABSTRACT

The invention uses the optical nonlinearity of electrically biased exciton polariton in a strong coupling regime or exciton polariton in a strong coupling regime with spatially separated electron and hole pairs. The method comprises providing a signal light (1300) to an exciton polariton system in a strong coupling regime and excitons with spatially separated electron and hole pairs, providing a control light (1302) to the exciton polariton system and removing the control light (1302). Various applications are available, including optical turnstiles, all-optical switches, all-optical phase retardation, low-power saturable transmitters and mirrors. In addition, the applications may operate at single- or few-photon levels.

59 Claims, 20 Drawing Sheets

OTHER PUBLICATIONS

Y. Kadoya et al, "Oscillator Strength Dependence of Cavity–Polariton Mode Splitting in Semiconductor Microcavities," Appl. Phys. Lett, 1996, 68(3): 281–283.

H. Kuwatsuka et al., "Calculation of the Second–Order Optical Nonlinear Susceptibilities in Biased $Al_xGa_{1-x}$ As Quantum Wells," Phys. Review B, 1994, 50(8):5323–5328.

H. Schmidt et al., "Giant Kerr Nonlinearities Obtained by Electromagnetically Induced Transparency," Optics Letters, 1996, 21(23): 1936–1938.

A. Shimizu, "Optical Nonlinearity Induced by Giant Dipole Moment of Wannier Excitons," Phys. Review Lett, 1988, 61(5):613–616.

C. Weisbuch et al., "Observation of the Coupled Exciton–Photon Mode Splitting in a Semiconductor Quantum Microcavity," Phys. Review Lett., 1992, 69(23): 3314–3317.

M. Yamanishi, "Field–Induced Optical Nonlinearity Due to Virtual Transitions in Semiconductor Quantum–Well Structures," 1987, 59(9): 1014–1017.

Norris, T. B., "Strong Coupling In Semiconductor Microcavities", *Confined Electrons and Photons: New Physics and Applications*, NATO ASI ser. B, vol. 340, Kluwer Academic/Plenum Publishers, ISBN 0–306–44990–0, May 1995, pp. 503–521, edited by Elias Burnstein et al.

\* cited by examiner

*Primary Examiner—*

SEMICONDUCTOR DEVICE WITH GIGANTIC PHOTON-PHOTON INTERACTIONS

CROSS-REFERENCE TO RELATED APPLICATIONS

This application claims priority under 35 U.S.C. 119(e) to U.S. Provisional Patent Application No. 60/170,401, filed Dec. 13, 1999 by Mathilde Rüfenacht, entitled "SEMICONDUCTOR DEVICE WITH GIGANTIC PHOTON-PHOTON INTERACTIONS," which application is incorporated by reference herein.

BACKGROUND OF THE INVENTION

1. Field of the Invention

This invention relates generally to electronic devices, and more particularly to semiconductor devices using photon-photon interactions.

2. Description of Related Art

The principal obstacle to the realization of few-photon all-optical devices is a known weakness of photon-photon interaction. Photon-photon interaction can be increased in semiconductor nanostructures by designing large optical nonlinearities, but those are usually achieved at the cost of a strong absorption and sometimes at the cost of speed. Atomic dark resonances were proposed in atomic systems as a means to obtain giant nonlinearities without loss and to achieve single photon blockade, i.e. a system allowing the transit of only a single photon at a time, analogous to a Coulomb blockade. See, for example, H. Schmidt and A. Imamoglu, Opt. Lett 21, 1936 (1996) and A. Imamoglu et al., Phys. Rev. Lett. 79, 1467 (1997), which are incorporated by reference herein.

Unfortunately, a similar scheme cannot be adapted to semiconductor structures, due to the short dephasing times inherent to them. It is however highly desirable to realize photon blockade in semiconductors, as well for device application as for the extreme adaptability of these systems.

Biasing quantum wells (QW) as a means of enhancing optical nonlinearities has already been proposed more than ten years ago. See D. S. Chemla, D. A. B. Miller, and S. Schmitt-Rink, Phys. Rev. Lett. 59, 1018 (1987), M. Yamanishi, Phys. Rev. Lett. 59,1014 (1987), A. Shimizu, Phys. Rev. Lett. 61, 613 (1988), and H. Kuwatsuka and H. Ishikawa, Phys. Rev. B 50, 5323 (1994), which are incorporated by reference herein. The nonlinearity arises from the field screening by the electron-hole dipole induced by the biasing. This process was found, however, to be practically of little use; a gain of nonlinearity arises only at small bias and in narrow QWs, where carrier separation is relatively small. The strongest optical nonlinearity was found for 7 nm wide QWs and with an electric field of 150 kV cm$^{-1}$. In wider QWs, the carrier separation is enhanced, but the gain due to increased screening is injured by the decrease of excitonic oscillator strength.

The situation is very different in exciton polariton microcavities. In the strong coupling regime, which usually prevails in QW microcavities, photon-exciton coupling is saturated and is not injured, in first-order approximation, by a decrease in oscillator strength. The present invention uses wider biased QWs to increase the field screening effect by several orders of magnitude at no detriment to the photon-exciton interaction.

SUMMARY OF THE INVENTION

To overcome the limitations in the prior art described above, and to overcome other limitations that will become apparent upon reading and understanding the present specification, the present invention discloses methods and devices using strong photon-photon interactions. The device comprises an exciton polariton system in a strong coupling regime and excitons with spatially separated electron and hole pairs. The method comprises providing a signal light to an exciton polariton system in a strong coupling regime and excitons with spatially separated electron and hole pairs, providing a control light to the exciton polariton system and removing the control light Various applications of the invention are available, including optical turnstiles, all-optical switches, all-optical phase retardation, low-power saturable transmitters and mirrors. In addition, the applications may operate at single- or few-photon levels.

Beside the strong photon-photon coupling, particular embodiments of the invention have several additional advantages to conventional exciton systems in QWs. A photon is either transmitted or reflected by the microcavity, but not absorbed. The polaritons, particularly the lower one, can only relax into the cavity mode, thus there is no absorption in the classical meaning of the term; each photon penetrating the cavity will exit. Consequently, there is no need to detune the photon energy from resonance to avoid absorption, as in conventional excitonic systems, and the invention does not suffer from dissipation.

In addition, there is a phenomenon in exciton polariton microcavities called motional narrowing that effectively reduces the polariton inhomogeneous broadening due to interface roughness. As a consequence, the polariton linewidth is narrower than usual exciton linewidth, which farther contributes in reducing the light intensity necessary to switch the microcavity.

An object of the present invention is to provide fast, low-absorption optical devices and methods that utilize gigantic photon-photon interactions. Another object is to provide such optical devices and methods that operate with single or few photons.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like numbers represent similar features throughout.

DETAILED DESCRIPTION INCLUDING THE PREFERRED EMBODIMENT

Figure 1:
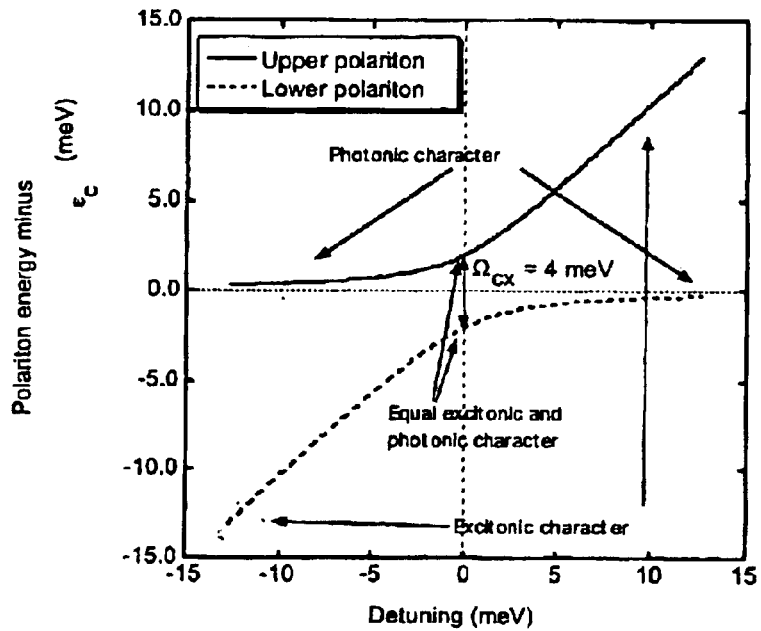
FIG. 1 illustrates a graph of the shift of polariton energy as a function of the detuning between the excitonic and cavity polariton.

In the following description, reference is made to the accompanying drawings which form a part hereof, and in which is shown by way of illustration specific embodiments in which the invention may be practiced. It is to be understood that other embodiments may be utilized and structural and functional changes may be made without departing from the scope of the present invention.

Overview

A semiconductor microcavity is typically formed of a semiconductor layer a wavelength thick, clad by two distributed Bragg reflectors (DBR). See e.g., E. Burstein and C. Weissuch (Eds.), Confined Electrons and Photons, NATO ASI ser. B, Vol. 340, Plenum Press, New York 1995, pp 503–521, which is incorporated by reference herein. A DBR is made of alternating dielectric materials of different refraction indexes and of quarter-wavelength thicknesses. The microcavity is highly reflective across a wide wavelength range and has a sharp transparency line at its resonance frequency. The width $\Gamma_c$ of this resonance depends on the quality and number of periods of the DBRs, and in practice can be nearly as sharp as $\Gamma_c \approx 0.1$ meV. A photon coupled to the resonance will penetrate in the cavity and stay there for a finite time $\tau_c$ given by $\tau_c = \hbar/\Gamma_c$ where $\hbar$ is the Planck constant.

In 1992, it was demonstrated that cavity photons couple very strongly to QW excitons at resonance, creating exciton polaritons, a quantum combination of a photon and an exciton. See C. Weisbuch et al., *Observation of the Coupled Exciton-Photon Mode Splitting in a Semiconductor Quantum Microcavity*, Phys. Rev. Lett. 69, 3314 (1992), which is incorporated by reference herein. Coupling energies as large as $\Omega_\alpha = 20$ meV were observed in multi-QW microcavities. The coupling gives rise to a splitting of the cavity resonance, called vacuum field Rabi splitting, observed as two peaks corresponding to the lower and the upper polariton, separated by the coupling energy $\Omega_\alpha$ in the transmission characteristic of the microcavity. The coupling energy is related to the exciton oscillator strength and cavity parameters as:

$$\Omega_{cx} = 2\sqrt{\frac{\hbar^2 e^2 f_{HH}}{2n_c^2 \varepsilon_0 m_0 L_{\text{eff}}}}$$

where e is the electric charge, $f_{HH}$ is the heavy-hole excitonic oscillator strength, $n_c$ is the refraction index of the cavity, $\varepsilon_0$ is the vacuum dielectric constant, $m_0$ is the electron mass, and $L_{\text{eff}}$ is the effective length of the microcavity. See E. Goobar, R. J. Ram, J. Ko, G. Bork, M. Oestreich, and A. Imamoglu, Appl Phys. Lett. 69, 3465 (1996), which is incorporated by reference herein.

Such exciton polariton microcavities in the strong coupling regime are virtually absorption-free as the excitons are only virtually excited, i.e. an external photon can only couple to the exciton through the cavity mode, and then can only relax back into the cavity mode. Another consequence of the virtual excitation is that the duration of the interaction, which gives the switching speed of the device, does not depend on carrier lifetime, as for devices depending on direct excitation, but depends on the cavity photon lifetime, which can be set by design, and is several order of magnitude faster. Also, contrary to usual QW exciton lineshape, polariton lineshape is limited by the cavity photon lifetime, and they can exhibit much sharper features, depending on the design of the microcavity.

FIG. 1 illustrates a graph of the shift of polariton energy as a function of the detuning between the excitonic energy and cavity photon energy. The energy of the polaritons is given by:

$$\varepsilon_\pm = \varepsilon_c + \frac{\Delta}{2} \pm \frac{1}{2}\sqrt{\Delta^2 + \Omega_{cx}^2}$$

where $\Delta = \varepsilon_x - \varepsilon_c$ is the detuning between excitonic energy $\varepsilon_x$ and cavity photon energy $\varepsilon_c$. The energy $\varepsilon_+$ designates the energy of the upper polariton and $\varepsilon_-$ designates the energy of the lower one.

The present invention allows optical switching of a microcavity from a transparent mode to a reflective mode by shifting the excitonic resonance. In order to switch the microcavity for an incoming photon initially resonant with a polariton line, the polariton energy must be shifted by an amount larger than its linewidth. In a microcavity initially at resonance with the exciton ($\varepsilon_x = \varepsilon_c$), this can be achieved by shifting the excitonic energy by at least an energy σ given by:

$$\sigma_\pm = \Gamma_c \frac{1 \pm \gamma}{1 \pm \frac{\gamma}{2}}$$

where $\sigma_+$ and $\sigma_-$ are the minimum excitonic shifts to detune the upper and lower polaritons, respectively and γ is given by $\gamma = \Omega_\alpha/\Gamma_c$.

Figures 2A, 2B:
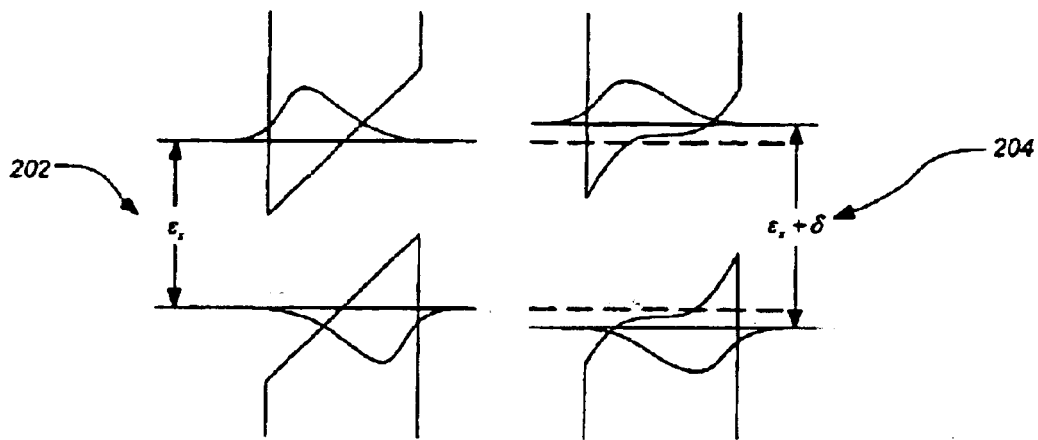
FIGS. 2A and 2B illustrate the effect of a finite exciton population on excitonic energy in biased QW.

FIGS. 2A and 2B illustrate the effect of a finite exciton population on excitonic energy in a biased QW. FIG. 2A illustrates the excitonic energy 202 of an empty QW, and FIG. 2B illustrates the excitonic energy 204 of a QW filled with excitons. In order to realize a photon blockade, a large nonlinear excitonic shift is needed. This condition can be realized in a microcavity with an electrically biased QW. Electron-hole pairs in a biased QW are spatially separated. The effect of the spatial separation is twofold. First, carrier separation enhances the nonlinear response of the excitonic system, as an exciton creates an electric field that screens the applied field by an amount proportional to the electron-hole separation, shifting the excitonic energy level by an amount δ204. Second, the reduction of excitonic oscillator strength results in a decrease of $\Omega_\alpha$. See Y. Kadoya et al., *Oscillator Strength Dependence of Cavity-Polariton Mode Splitting in Semiconductor Microcavities*, Appl. Phys. Lett. 68, 281 (1996) and T. A. Fisher et al., Phys. Rev. B 51, 2600 (1995), which are incorporated by reference herein. This decrease of $\Omega_\alpha$ has only a small effect on optical nonlineatities, as long as the system is in the strong coupling regime ($\gamma$>2). It degrades only slightly the performance of switching on the lower polariton branch, and slightly enhances the performance of switching on the upper polariton branch, by increasing the excitonic energy shift necessary to shift the lower polariton, and by decreasing this energy for the upper polariton.

Figure 3:
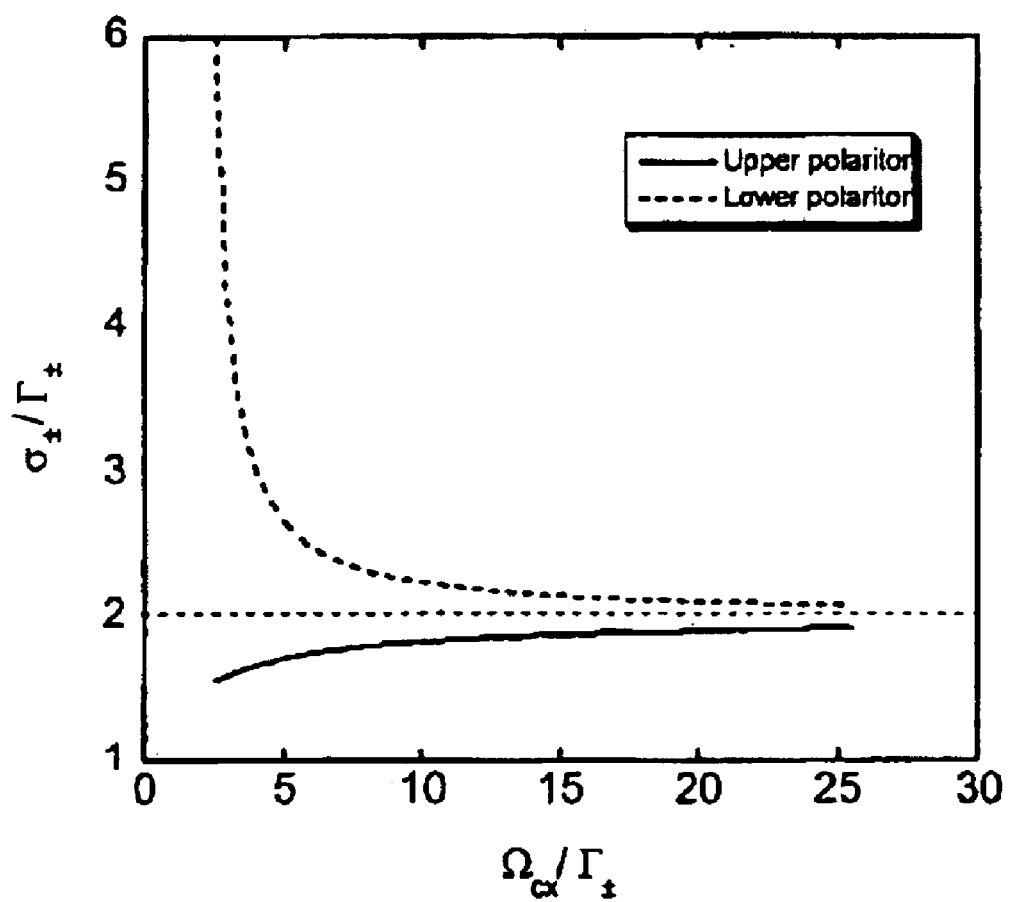
FIG. 3 illustrates a normalized minimal shift of excitonic energy to move the polariton energies by their linewidths.

FIG. 3 illustrates a normalized minimal shift $\sigma\pm/\Gamma\pm$ of excitonic energy to move the polariton energies by their linewidths as a function of the normalized Rabi splitting $\Omega_\alpha/\Gamma\pm$. The normalization factors $\Gamma_-$, respectively $\Gamma_+$, are the linewidths of the lower, respectively the upper polariton. The shift is almost independent of the Rabi splitting, i.e. of the excitonic oscillator strength, over a large range of values. This is in striking contrast to pure excitonic systems, where a reduction of oscillator strength greatly degrades the optical nonlinearity. As a result, large bias and wide QWs may be used where large screening effects occur, yielding huge nonlinearities.

To improve the optical nonlinearity, the spatial separation of the electron-hole pairs is important. This separation can be obtained by other means than applying external bias. For example, built-in bias can be obtained by adequate doping or by putting a Schottky gate at the surface. Also, asymmetric QWs like step QWs, and type-I-type-II semiconductor structures present spatial separation and should exhibit enhanced photon-photon interactions.

Figure 4:
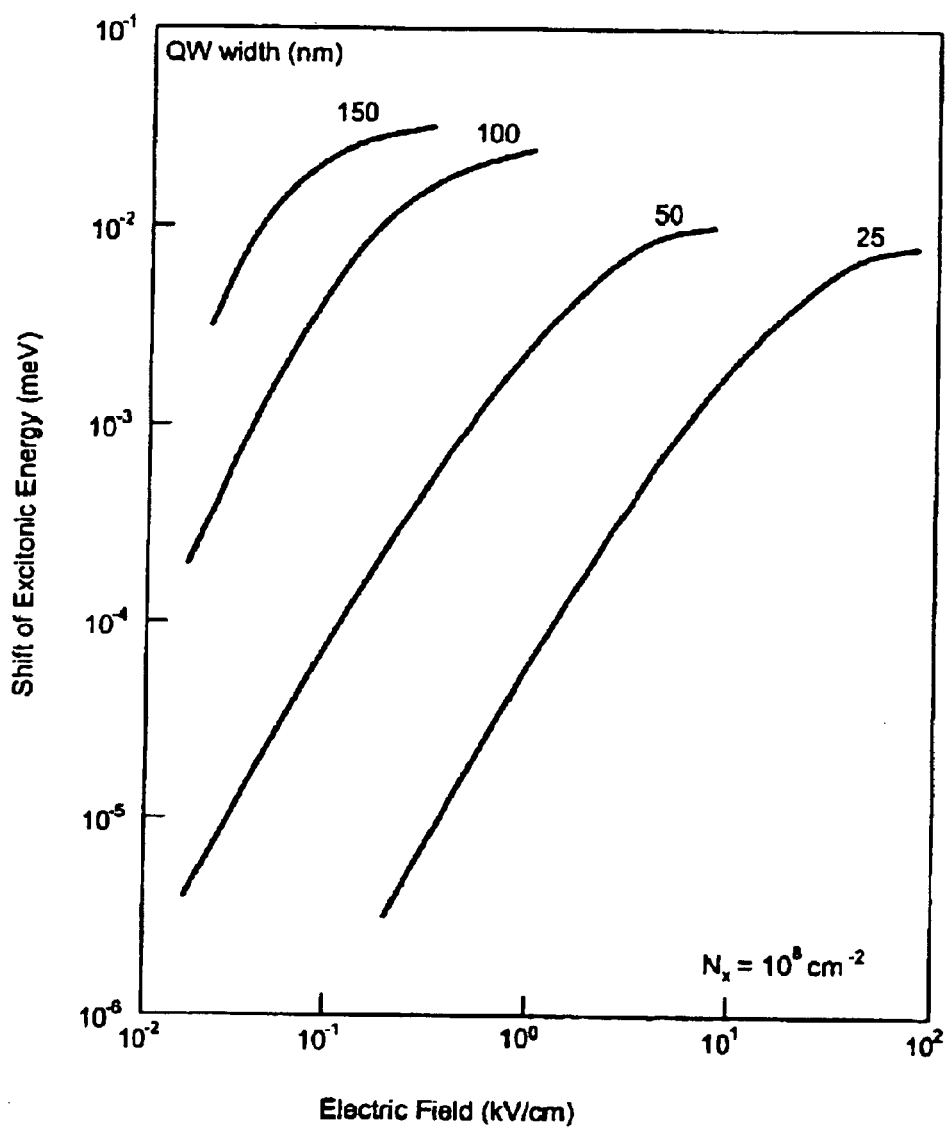
FIG. 4 illustrates screening-induced excitonic shift for an excitonic population of $N_x=10^8$ cm$^{-2}$ as a function of applied electric field and for several QW widths.

FIG. 4 shows the shift in excitonic energy induced by screening by an exciton population $N_x$ of $10^8$ cm$^{-2}$ as a function of applied electric field and for different QW widths. The shift was obtained by solving the one-dimensional Schrodinger equation self-consistently for a uniform electron-hole population in a biased GaAs-AlAs QW. The screening effect is larger in wider QWs.

Figure 5:
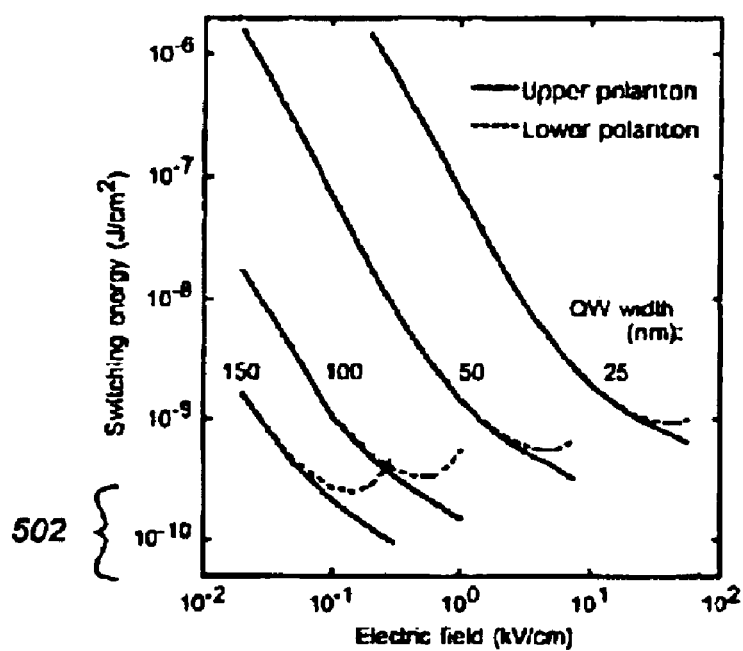
FIG. 5 illustrates light pulse energy density penetrating the cavity, necessary to switch it from a transparent to a reflective mode.

As an example, discussed below is the optical intensity needed to switch an exciton polariton microcavity with a single GaAs/AlAs QW, of cavity linewidth $\Gamma_c$=0.1 meV, which corresponds to a photon lifetime of $\tau_c$=7 ps. Different linewidths and materials will yield different intensities. FIG. 5 shows the light pulse energy density penetrating the cavity, required to shift the polariton energies by their linewidths, as a function of electric field and for several QW widths. The Rabi splitting at finite electric field was estimated by scaling zero-field values known in the art by the overlap integral of electron-hole wavefunctions perpendicular to the QW. The contribution of the in-plane part of the excitonic wavefunction was neglected.

In FIG. 5 solid lines are for the upper polariton branch and dashed lines for the lower one. Each curve is shown for electric fields F satisfying the condition $\Omega_\alpha(F)$>2$\Gamma_c$. When F is larger than that, the cavity leaves the strong coupling regime and switching is suppressed. The duration of the switching is given by the cavity photon lifetime. In FIG. 5, the region 502 corresponds to a single photon penetrating a microcavity pillar of 0.3 μm diameter. In this region 502, the microcavity may be switched between a transparent and a reflective mode by a single photon. This region 502 is reached in both polariton branches with a 100 nm thick QW and an applied field of 0.5 kV cm$^{-1}$. In narrow microcavity pillars, the lateral confinement of the light field should also be taken into account and may yield a further increase of the screening effect.

Concerning the Rabi splitting $\Omega_\alpha$, as long as we have $\gamma\geq 4$, its value only weakly affects the shift of the lower polariton. For the upper polariton branch, a small $\Omega_\alpha$ is advantageous for larger nonlinearity. On the other hand, $\Omega_\alpha$ should be larger than $2\Gamma_c$ ($\gamma$>2) so that the two polaritons are decoupled. Practically, the upper polariton requires a smaller excitonic shift than the lower polariton ($\sigma_+<\sigma_-$), in order to be detuned from the incident light. However, upper polariton branch suffers from scattering and presents typically a larger linewidth than the lower polariton. For loss-less operation, the lower polariton line should be used. A small $\Gamma_c$ and a small diameter microcavity pillar are used in order to minimize the size of the switching intensity.

EXAMPLE EMBODIMENTS

As discussed, the invention uses exciton polariton in the strong coupling regime with spatially indirect excitons to realize gigantic photon-photon interactions. The optical properties of an exciton polariton semiconductor microcavity are described here with respect to a biased QW or a biased multiquantum well in the cavity. However, the invention is not limited to microcavities or biased QWs. Other examples are provided below.

Figure 6:
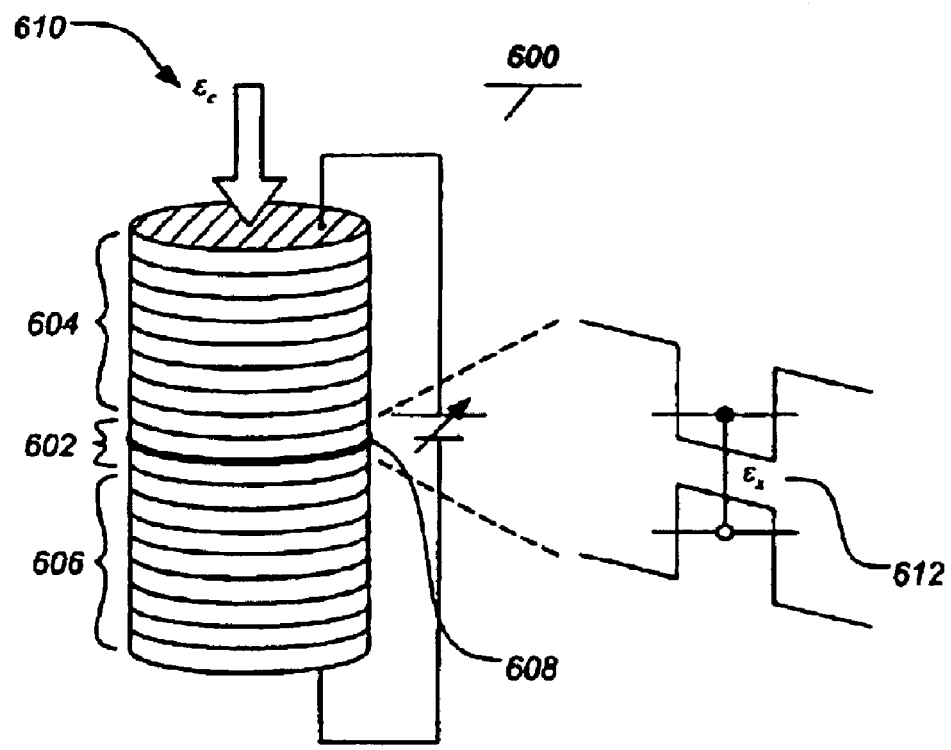
FIG. 6 illustrates a biased semiconductor microcavity of the invention formed of two distributed Bragg reflectors (DBRs), cladding the central cavity with a quantum well (QW)

FIG. 6 illustrates a biased semiconductor microcavity 600 embodiment of the invention formed of two distributed Bragg reflectors (DBRs) 604, 606, cladding the central cavity 602. The QW 608 is centered in the microcavity 602. An electrically biased semiconductor microcavity 608 of cavity photon energy $\epsilon_c$ 610 with a QW of excitonic energy $\epsilon_x$ 612 is shown. When the cavity photon and the exciton are out of resonance ($\epsilon_c \neq \epsilon_x$), the microcavity has a region of high reflectivity, with a sharp peak of transmission at the cavity photon energy. This transmission peak has a linewidth of $\Gamma_c$ that depends on the Q-factor of the cavity and represents the lifetime $\tau_c$ of the photon in the cavity by the relation:

$$\tau_c = \frac{\hbar}{\Gamma_c}$$

where $\hbar$ is the Planck constant.

Figure 7:
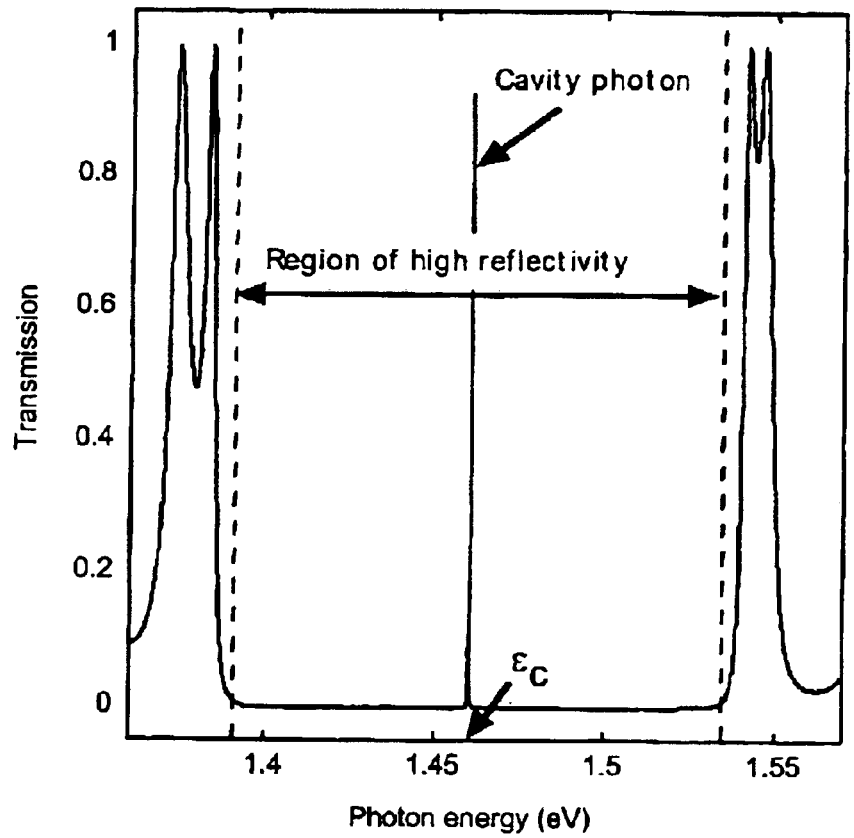
FIG. 7 illustrates a typical transmission characteristic of a symmetric microcavity without exciton, or with an excitonic energy out-of-resonance with the cavity photon energy.

FIG. 7 illustrates a typical transmission characteristic of a symmetric microcavity. In a symmetric microcavity, the transmission is nearly perfect at the cavity photon energy $\epsilon_c$. When the cavity photon and the exciton are in, or near, resonance ($\epsilon_c \cong \epsilon_x$), there are strong photon-exciton interactions. The eigenmode of the cavity splits and forms two polaritons, which are a mixture of an exciton and a photon. In the strong coupling regime, which prevails in semiconductor microcavities with a resonant QW exciton, the photon-exciton coupling is saturated and the two polaritons appear in the transmission characteristic of the microcavity as two separated peaks, one for each polariton.

Figure 8:
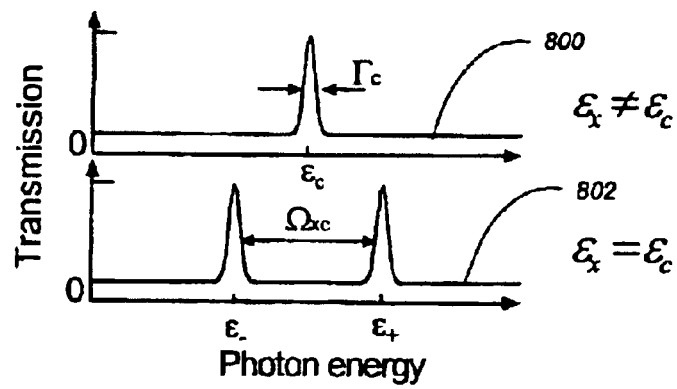
FIG. 8 illustrates the transmission characteristic of a microcavity around the cavity photon energy with an excitonic energy in and out-of resonance.

FIG. 8 illustrates the transmission characteristic of a microcavity around the cavity photon energy. The top curve 800 schematically depicts the transmission when $\epsilon_c \neq \epsilon_x$ and the cavity photon and exciton are far from resonance. The bottom curve 802 schematically depicts transmission of the lower and upper polaritons when the cavity photon and exciton are in resonance, $\epsilon_c = \epsilon_x$.

As previously discussed, the energies of the polaritons are given by:

$$\varepsilon_\pm = \varepsilon_c + \frac{\Delta}{2} \pm \frac{1}{2}\sqrt{\Delta^2 + \Omega_{cx}^2}$$

The upper polariton has mainly a photonic character for negative detuning and mainly an excitonic character for positive detuning, as shown for example in FIG. 1. This is reversed for the lower polariton. At resonance ($\Delta=0$) both polaritons have equal photonic and excitonic characters. Only the photon-like part of the polariton gives rise to a transmission peak, resulting in the transmission peak of only the upper polariton for large negative detunings and of only the lower polariton for large positive detunings.

When the cavity photon and the exciton are in resonance ($\epsilon_c = \epsilon_x$), the two polariton energies are separated by the coupling $\Omega_\alpha$, also called vacuum-field Rabi splitting. As previously discussed, it is given by:

$$\Omega_{cx} = 2\sqrt{\frac{\hbar^2 e^2 f_{HH}}{2 n_c^2 \varepsilon_0 m_0 L_{eff}}}$$

Significantly, the coupling depends on the square root of the oscillator strength.

The two polaritons of a microcavity initially in resonance with the excitonic energy ($\epsilon_c = \epsilon_x$) are separated by $\Omega_\alpha$, and present equal excitonic and photonic characters. Since the microcavity is biased, the exciton is formed of a spatially separated electron-hole pair and the excitation of a polariton in the microcavity generates an electric field that tends to reduce the carrier separation. This electric field shifts the electron and hole energy levels and increases the excitonic energy by an amount $\delta$, as previously shown in FIGS. 2A and 2B. This change leads to a shift $\Delta_\pm$ in polariton energies. The shifts $\Delta_\pm$, where + is for the upper polariton and − is for the lower one, are related to the excitonic energy shift $\delta$ by:

$$\Delta_\pm = \frac{1}{2}\left(\delta \pm \sqrt{\delta^2 + \Omega_{cx}^2} \mp \Omega_{cx}\right)$$

In particular, the microcavity can be switched from a transmittive to a reflective mode when the upper or lower polariton energies shift by an amount equal or larger to their linewidths $\Gamma_+$ and $\Gamma_-$, respectively. The minimum shift in excitonic energy that can accomplish this switching is:

$$\sigma_\pm = \Gamma_\pm \frac{1 \pm \gamma_\pm}{1 \pm \frac{\gamma_\pm}{2}}$$

where $\sigma_+$ and $\sigma_-$ are the minimum excitonic energy shifts to detune the upper and lower polaritons, respectively, and $\gamma_\pm$ is given by $\Omega_\alpha/\Gamma_\pm$, where the sign + is for the upper polariton, and the sign − is for the lower polariton.

For most of the values of Rabi splitting, the minimal excitonic shift is approximately two times the linewidth, as previously shown in FIG. 3, for example.

As discussed above, spatial separation of electrons and holes leads to a reduction in excitonic oscillator strength. This decrease affects the microcavity system. Since there is a saturated exciton-photon coupling, the reduction in oscillator strength does not injure the exciton-photon coupling in first approximation. As long as there is a strong coupling regime, the only effect of the reduction in oscillator strength is to decrease the Rabi splitting, $\Omega_\alpha$. As can be seen from above equation, a decrease in $\Omega_\alpha$ only weakly affects the nonlinear behavior of the polaritons and even slightly enhances the nonlinear shift of the upper polariton. The enhanced field screening effect of spatially indirect excitons can be used to realize huge ultrafast photon-photon coupling.

Figure 9A:
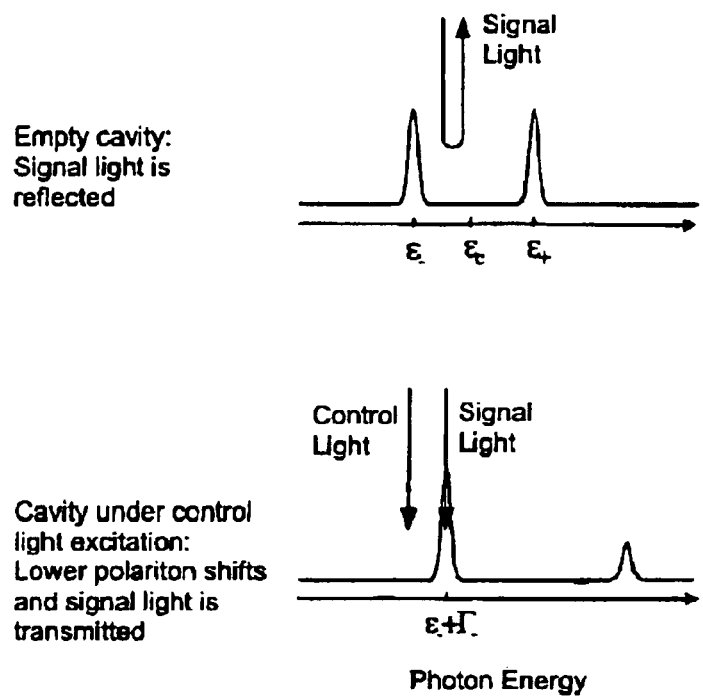
FIGS. 9A–9D illustrate various switching processes of the invention.
Figure 9B:
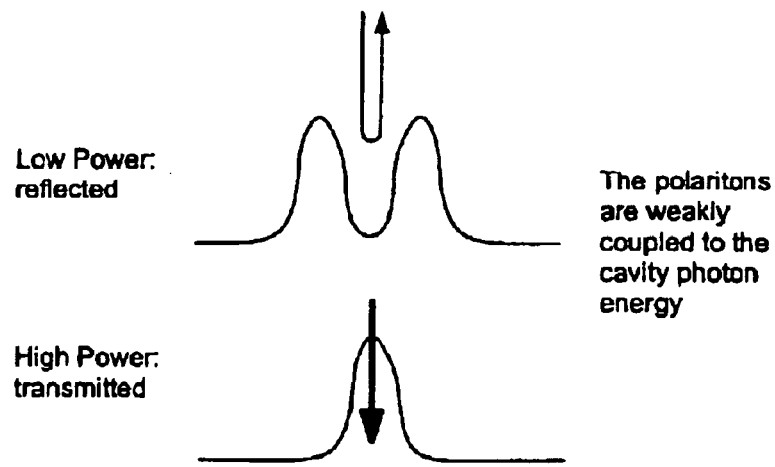
Figure 9C:
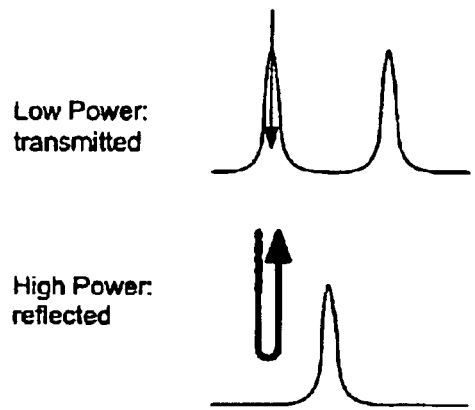
Figure 9D:
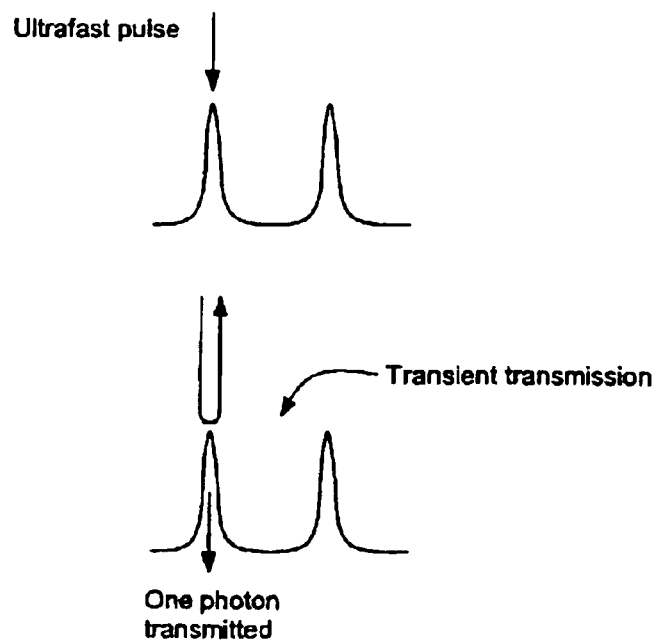

FIGS. 9A–9D illustrate various switching processes of the invention, wherein FIG. 9A illustrates an optically controlled switch, FIG. 9B depicts another embodiment of a saturable mirror, FIG. 9C illustrates a low-power saturable transmitter embodiment formed from a light beam coupled to a polariton in a biased microcavity will be transmitted up to some power, above which the beam is reflected, and FIG. 9D illustrates a single photon turnstile embodiment. These embodiments shall be discussed in more detail below.

Such strong coupling allows optically switching a microcavity from a reflective to a transmittive mode with low light intensity as shown in FIG. 9A, for example. The two curves show the transmission characterisitcs of the microcavity with and without a control light coupled on the lower polariton. With the control light, polaritons are created in the microcavity and their electric dipole shifts the lower polariton energy into resonance with the signal light, which is then transmitted. Without the control light, a signal light of photon energy $\epsilon_- + \Gamma_-$ is reflected by the microcavity. For practical switching applications, the Rabi splitting should be at least two times the polariton linewidths $\Gamma_\pm$. This condition sets a lower limit on the size of the oscillator strength, and hence an upper limit on the size of the spatial separation.

The light pulse energy necessary to optically shift the upper and lower polaritons by their linewidths varies for different QW widths and as a function of applied electric field. See FIG. 5, for example which uses a polariton linewidth of $\Gamma_\pm = 0.1$ meV and is based on a self-consistent calculation of the QW wavefunctions. The curves are traced up to the values of electric field where the Rabi splitting becomes smaller than two times the polariton linewidth ($\Omega_\alpha < 0.2$ meV). The curves show that larger QWs necessitate weaker switching pulse energy. This is due to the larger spatial separation of electron-hole pairs afforded by wide QWs.

Figure 10:
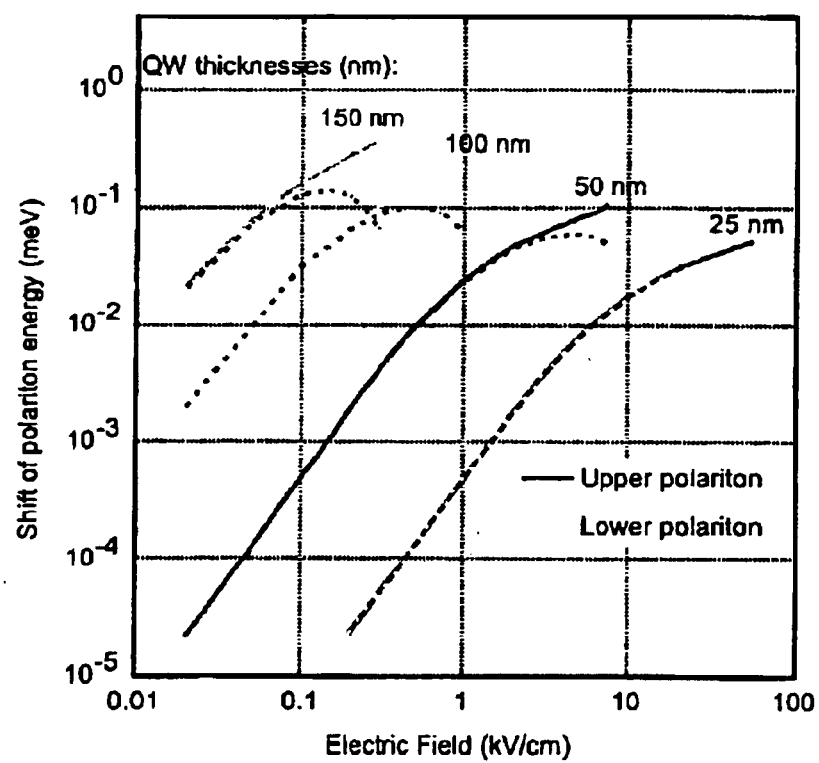
FIG. 10 illustrates shifts of polariton energy afforded by the penetration of photon in a microcavity pillar of 0.3 μm diameter and of 0.1 meV cavity photon linewidth.

Effects of the change of excitonic Bohr radius by carrier separation are disregarded. A microcavity with a 100 nm QW can be switched from a reflective to a transmittive mode with a light pulse of 50 W350 pJ/cm² intensity, or with a cw light of 50 W/cm² intensity. The duration of the switching is given by the cavity photon lifetime, which is $\tau_c = 7$ ps in the present example for a cavity linewidth of 0.1 meV FIG. 10 illustrates shifts of polariton energy afforded by the penetration of a photon in a microcavity pillar of 0.3 $\mu$m diameter and 0.1 meV linewidth, for several QW thicknesses and as a function of applied electric field. The curves are traced up to the values of electric field where the Rabi splitting becomes smaller than two times the polariton linewidth ($\Omega_\alpha < 0.2$ meV). As shown, by reducing the cavity lateral dimensions, the present invention may be used to realize a single- or few-photon blockade, a device allowing the passage of only one photon, or a few photons, at a time.

These results were obtained by scaling above results to the microcavity pillar surface area. Effects of lateral confinement on the cavity modes are neglected. According to the invention, a microcavity pillar with a biased 100 nm QW may be switched from a reflective to a transmittive mode by a single photon or a few photons.

In a typical embodiment of the invention a semiconductor microcavity is formed of one or several QWs, clad between semiconductor or dielectric Bragg reflectors (DBRs), one p-doped and the other n-doped, as shown in FIG. 6, for example. Electron-hole separation is achieved by applying a finite reverse bias between the p- and n-electrodes. Unlike vertical cavity semiconductor lasers that otherwise have a similar structure the invention does not inject carriers. For this reason, the doping does not need to extend down to the active layers, but it can be confined to the external layers of the DBRs. A Schottky gate could also be used instead of the p-doped electrode. The cavity can be formed of GaAs/AlGaAs quantum wells, or any other semiconductor system with large excitonic oscillator strength. The cavity length is designed such that the cavity photon energy is in resonance with the biased exciton energy. In such biased microcavities, it is possible to tune the exciton energy with the bias to bring it in perfect resonance with the cavity photon. In order to increase the electron-hole spatial separation, large QWs may be preferred to narrow ones. Typically, QWs of at least several hundred Angstrom in width are used. In addition, the applied bias should be as large as possible while remaining in the strong coupling regime.

The number of periods of the DBRs, or their reflectivity, will be selected depending upon the function of the application. When speed is preferred to sensitivity, a low Q-factor cavity can be used. The cavity photon lifetime, related to the switching time, is then short, but the cavity linewidth is broad and more power is needed to switch the polariton out of resonance. In general, a high Q-factor is desirable, as it yields narrow cavity linewidth and low switching powers. In applications where switching between a transmittive and a reflective mode is needed, symmetric DBRs are the most appropriate as they insure a large transmission probability at resonance. In applications where the signal is to be always completely reflected, the reflectivity of the bottom DBR should be increased, or instead a metallic mirror may be used.

In one embodiment, an all-optical switch may be formed from a symmetric microcavity with biased QWs, where the cavity photon and the biased exciton energies are in resonance ($\epsilon_c = \epsilon_x$). When an optical beam of photon energy $\epsilon_- + \Gamma_-$ is incident on the empty cavity, it is totally reflected. Exciting the lower polariton with a control light beam of photon energy $\epsilon_-$ can shift the lower polariton by its linewidth $\Gamma_-$ and bring it in resonance with the initial beam, as shown in FIG. 9A, for example. The light beam at photon energy $\epsilon_- + \Gamma_-$ will then be transmitted. Alternatively, the control light can also be tuned on the upper polariton energy $\epsilon_+$ in order to shift the lower polariton. This switching can be realized with relatively low intensity of control beam, and is not accompanied by heating, like switchings obtained by exciton bleaching for example, since there is no, or little, dissipation, and all the light exits the cavity. A microcavity with a high Q-factor and a system designed so that the Rabi splitting $\Omega_\alpha$ is only a few times larger than the polariton linewidths causes the shifted lower polariton to come near the cavity photon energy. It presents then mainly a photonic character and does not couple, or couples only weakly to the exciton. Therefore, the cavity is highly transmittive at the shifted lower polariton energy, and stable under optical excitation. In this switching device, a low intensity control beam can switch the path of a much higher intensity light, from total reflection to high transmission. To elaborate, a wavelength converter can be realized with the input light tuned on the lower polariton energy. A continuous wave (cw) light resonant with the cavity photon energy reproduces the temporal dependence of the input light at the exit of the device, as the polariton energy is switched in and out of resonance. In the same configuration, an all-optical on/off switch can be realized with the control light tuned to the polariton energy, and the signal light resonant with the cavity line.

FIG. 9B depicts a saturable mirror. A light incident on the cavity line will be reflected as long as the polariton is out of resonance. When the Rabi splitting is designed small enough to have a weak coupling between the polaritons and the cavity photon energy, the light will couple weakly to the polariton through the tail of its lineshape. When the power of the incident light is large, it will shift the polariton line toward the cavity line and the cavity will become transparent. Adjusting the Rabi splitting will change the light intensity threshold between reflection and transmission of the incoming light. A small Rabi splitting will yield a lower threshold intensity, at the cost of a smaller extinction ratio of the low intensity signal.

FIG. 9C illustrates a low-power saturable transmitter embodiment formed from a light beam coupled to a polariton in a biased microcavity will be transmitted up to some power, above which the beam is reflected. Again, the threshold can be adjusted by changing the Rabi splitting. For a light beam coupled to the lower polariton, a smaller Rabi splitting will yield a higher threshold. Non-linear devices like the saturable mirror and the saturable transmitter can be used for example in laser cavities for low power mode-locking.

The saturable transmitter and saturable mirror can also be used as optical discriminator to clean up the low level noise from an incident optical digital signal. The cleaned signal will be reflected for a saturable transmitter, and transmitted for a saturable mirror.

In addition, the invention can be extended to devices operated with single or few photons by reducing the lateral dimensions of die microcavity.

FIG. 9D illustrates a single photon turnstile embodiment. In the single-photon blockade limit, strong photon antibunching is produced. The present invention can also be used in a single-photon turnstile device by driving the cavity with a 100 fs pulsed laser. The highly non-classical light that exits a photon turnstile has an intensity noise well under the classical shot noise limit and is of particular interest for quantum information processing and quantum communication.

In the same configuration, driving the cavity with a high intensity cw light can produce at the exit periodic light pulses of period given by the cavity photon lifetime, realizing an optical oscillator.

Figure 11:
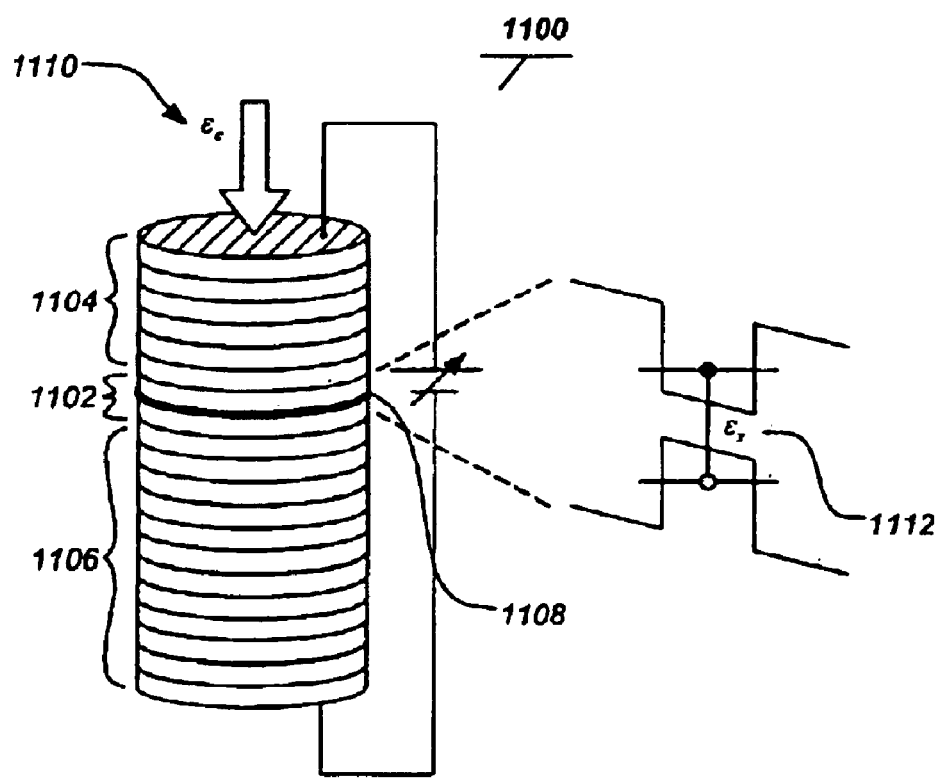
FIG. 11 illustrates an example phase retardation embodiment of the invention.

FIG. 11 illustrates an example phase retardation embodiment of the invention. An all-optical phase retardation device 1100 is formed from a microcavity with a biased QW 1108. The bottom DBR 1106, much thicker than the top DBR 1104, may also be replaced by a dielectric or metallic mirror. The cavity photon 1110 and the biased exciton 1112 are in resonance ($\epsilon_c = \epsilon_x$). Then a light incident to the cavity 1102 will always be reflected, but its phase change will be different when it couples to the cavity 1102, or when it is reflected directly by the top DBR 1104 without penetrating the cavity 1102. The switching between these two behaviors can again be done with a control light beam tuned to one of the polaritons. The amplitude of the retardation can be controlled by design.

There are many ways of realizing exciton polariton systems in the strong coupling regime, with spatially separated excitons. Strong coupling is usually found in confined photon systems. For example, strong coupling is found in planar microcavities formed of a cavity layer clad between two DBRs or between metallic mirrors. Strong coupling is also found in microcavity pillars, which are similar to planar microcavities but with an additional lateral confinement. Strong coupling can also be found in distributed feedback microcavities, which are formed of a planar waveguide with two gratings surrounding an optical cavity. Strong coupling exists in microdisks where the photons are confined by total reflection at the internal face of a disk. Strong coupling is also found in photonic crystal cavities, which are periodic multidimensional structures presenting a photonic band gap with a break of periodicity forming the cavity. The present invention may use any of these or other exciton polariton systems in the strong coupling regime.

Much of the foregoing description is made in relation with QWs. However, quantum dots are also used commonly in semiconductor microcavities and quantum wires may be used as well. Quantum wires are used in distributed feedback microcavities. Quantum wells (and quantum wires and quantum dots) are used to increased the excitonic oscillator strength to reach the strong coupling regime. Also, the confinement gives some control on the size of electron-hole spatial separation. In quantum wires and quantum dots, the excitons are confined along extra dimensions, and the carrier separation can be realized along those extra dimensions instead. For example, in microcavities with quantum dots or quantum wires, an electric field may be applied along the cavity layer (rather than normal to the cavity layer) to create carrier separation.

Regarding distributed feedback microcavities, see Tohru Fujita, Yoshihiro Sato, Tetsuya Kuitani, and Teruya Ishihara, *Tunable polariton absorption of distributed feedback microcavities at room temperature*, Phys. Rev. B, 57(19), pp. 12428–12434 (1998) which is incorporated by reference herein. This is a planar waveguide with distributed gratings surrounding a cavity. Slabs of semiconductor materials (quantum wires) can be inserted inside the cavity to reach the strong coupling regime. This approach applied in the present invention is particularly interesting, as it may be integrated on a single chip with other semiconductor devices (e.g. lasers, modulators, etc.) for integrated optical applications.

Figure 12A:
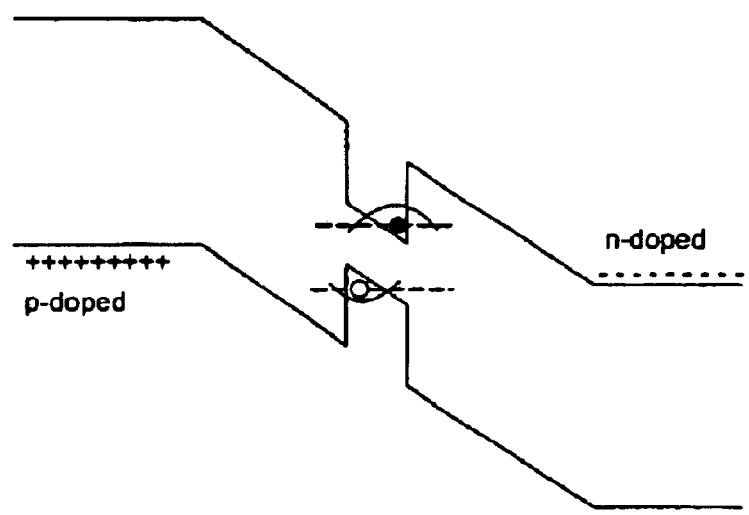
FIGS. 12A–12D illustrate additional methods of carrier separation.
Figure 12B:
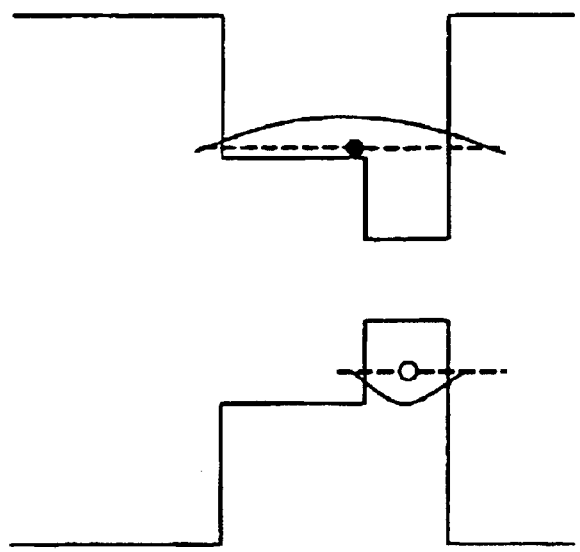
Figure 12C:
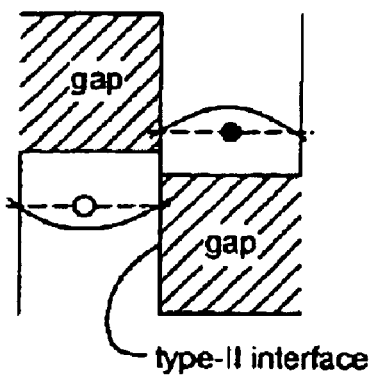
Figure 12D:
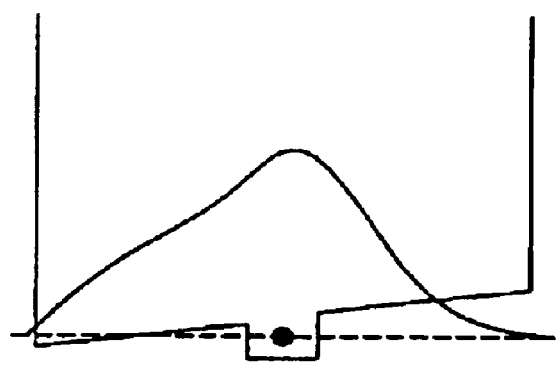
Figure 12D:
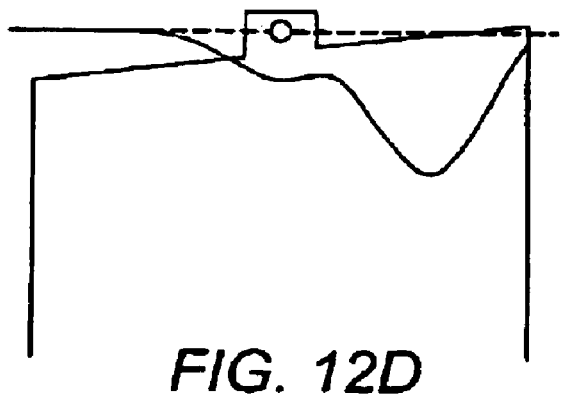

FIGS. 12A–12D illustrate some additional methods of carrier separation. Excitons with spatially separated electron and hole pairs are found in many systems. There are two classes of methods of creating carrier separation, separation by electric field and separation by band structure or wavefunction engineering. In the first class, examples are QWs or quantum dots with an electric field applied normally to the epitaxial layers (e.g. as shown in FIGS. 2A and 2B) and structures with a built-in electric field obtained by doping (e.g. as shown in FIG. 12A). In the second class, examples are asymmetric QWs (e.g. a step QW as shown in FIG. 12B), where the electron wavefunction is more extended than the hole wavefunction due to the difference in mass, and structures formed with type II semiconductors (e.g. as shown in FIG. 12C), where the QW for the holes is different from the QW for the electrons. In all of these structures, there should be some minimal amount of overlap between the electron and hole wavefunctions in order to have finite oscillator strength. Both methods of carrier separation, by electric field and by wavefunction engineering, may also be combined to yield a high degree of carrier separation while maintaining a minimum overlap (e.g. as shown in FIG. 12D).

Each of the ways of confining photons can be combined with any of the techniques to spatially separate the exciton in order to realize strong photon-photon coupling in the invention.

Design Factors

The present invention affords a great variety of possible uses and applications through the selection of various design parameters. The following illustrates the range of design choices. Those skilled in the art will recognize many equivalent modifications to achieve the same results.

The cavity photon energy can be tuned by changing the angle of incidence of the light, or by changing the refraction index or the thickness of the cavity. These factors will also affect the linewidth of the cavity photon. The excitonic energy can be tuned by changing the temperature of the device. It will also affect the cavity photon energy, but usually by a smaller amount. If the exciton and the cavity photon are not initially in resonance, they can be brought in resonance by modifying one or several of these factors. In addition, in externally biased devices, it is further possible to tune the Rabi splitting by changing the bias (a larger bias, meaning a larger spatial separation of electrons and holes, results in a decrease of Rabi splitting). However, another effect of changing the bias is to change the excitonic energy larger biases yield smaller excitonic energy). Thus the cavity needs to be brought back into resonance by tuning the cavity photon energy, or the excitonic energy by one of the other way cited above. Such techniques for tuning the cavity photon, exciton and Rabi splitting are known in the art.

Since changing the bias changes the excitonic energy, it is possible to bring the exciton in- and out-of-resonance with the cavity photon by modulating the electric field. As a corollary, all of the foregoing embodiments, where a control light tuned on a polariton shifts the exciton energy out-of-resonance, can be achieved on the same device with an electrical control. This will provide an ultrafast (electrically-controlled) optical modulator, where the transmission and reflection of a light beam are controlled by an electric field. A combination of electrical control and optical control can also be obtained for more sophisticated devices, such as where the electrical control enables or disables the optical control.

Figure 13:
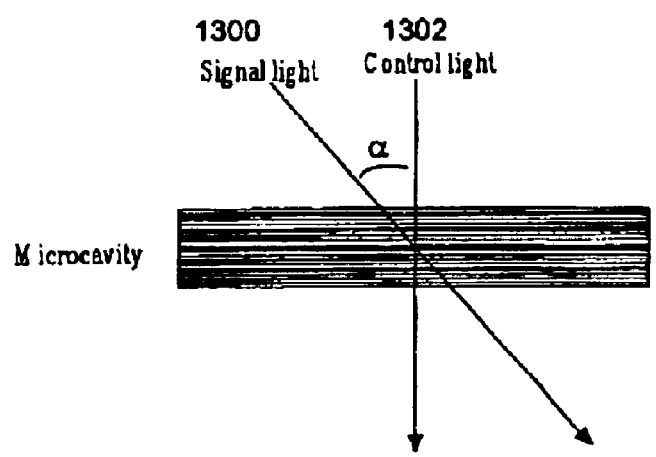
FIG. 13 illustrates a signal light and control light incident at different angles.

FIG. 13 illustrates the invention in regard to a signal 1300 light and control 1302 light incident at different angles. A corollary to the fact that the cavity photon energy depends on the angle of the incoming light is that the cavity can be simultaneously in resonance with the exciton for some light incoming at some angle, and out-of-resonance for some light at some other angle. For simplicity, the foregoing embodiments have been described for signal 1300 and control 1302 lights incident along the same direction, but this restriction is not necessary, and the possibilities of device are multiplied for cases when control 1302 and signal 1300 light have a different angle. For example, the aforementioned switching device is described with the control 1302 light coupled to a polariton, and the signal 1300 light coupled to the cavity photon. If both lights are incident with the same angle, the signal 1300 light will be reflected when the control 1302 light is off, and transmitted when the control 1302 light is on. To realize the inverse function when the signal 1300 and control 1302 light are incident with the same angle (a signal light transmitted when control 1302 light is off, and reflected when control 1302 light is on), the signal 1300 light may be coupled to a polariton line. However, this may not be preferred since the transmission characteristics will then depend on the signal 1300 light intensity. However, the inverse function can be realized without this drawback when the control 1302 light and the signal 1300 light are incident with different angles.

Figure 14:
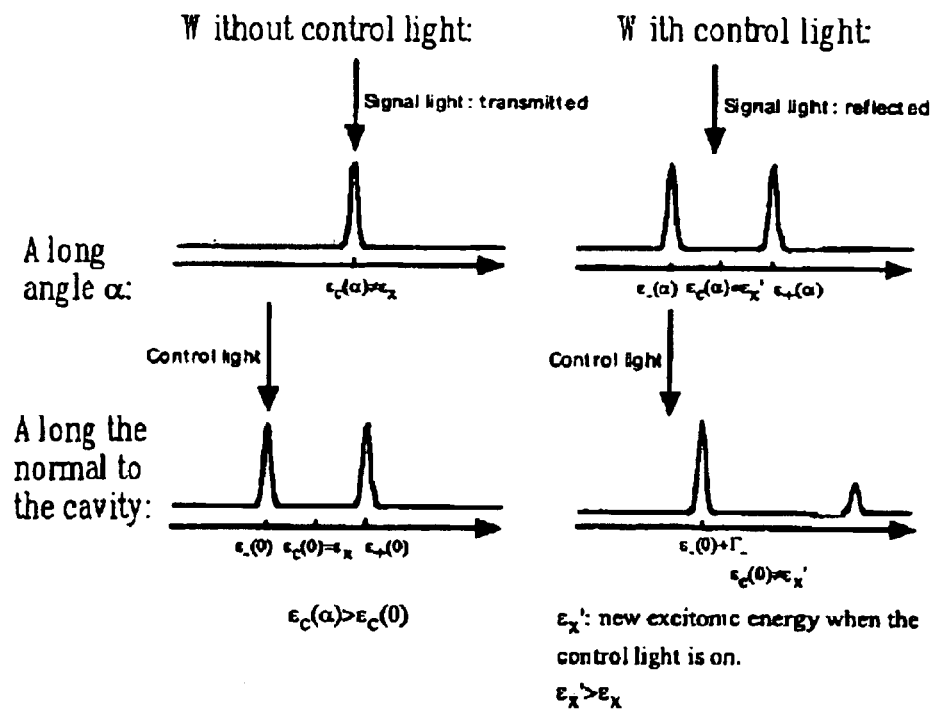
FIG. 14 illustrates the transmission characteristics of an embodiment with a control light incident normally to the microcavity and a signal light incident with an angle α.

FIG. 14 illustrates the transmission characteristics of an embodiment with a control light is incident normally to the microcavity and a signal light incident with an angle $\alpha$. The cavity photon energy at normal angle is smaller than the cavity photon energy at angle $\alpha(\epsilon_c(\alpha)>\epsilon_c(0))$. Therefore, a configuration may be produced where the cavity photon energy at normal incidence $\epsilon_c(0)$ is in resonance with the excitonic energy $\epsilon_x(\epsilon_c(0)=\epsilon_x)$ and the cavity photon energy at angle $\alpha$, $\epsilon_c(\alpha)$, is out-of-resonance ($\epsilon_c(\alpha) \neq \epsilon_x$); the excitonic energy is almost independent of the angle. Therefore, in the transmission characteristic at normal incidence, there are two polariton peaks, and in the transmission characteristic at angle $\alpha$, there is only a transmission peak at the cavity photon energy. In this configuration, if the signal light is coupled to the cavity photon at angle $\alpha$, it will be transmitted when the control light is off When the control light is on, and coupled to the lower (or upper) polariton at normal incidence $\epsilon_-(0)$ (or $\epsilon_+(0)$) it will shift the excitonic energy $\epsilon_x$ to a higher value $\epsilon_x'(\epsilon_x'>\epsilon_x)$. For the adequate choice of angle $\alpha$, the shift of excitonic energy may bring the exciton into resonance with the cavity photon at angle $\alpha(\epsilon_c(\alpha)=\epsilon_x')$ Then, the transmission characteristic along angle $\alpha$ will be shown as two transmission peaks at the polariton energies, and the signal light coupled to the cavity photon at angle $\alpha$ will be reflected.

Figure 15:
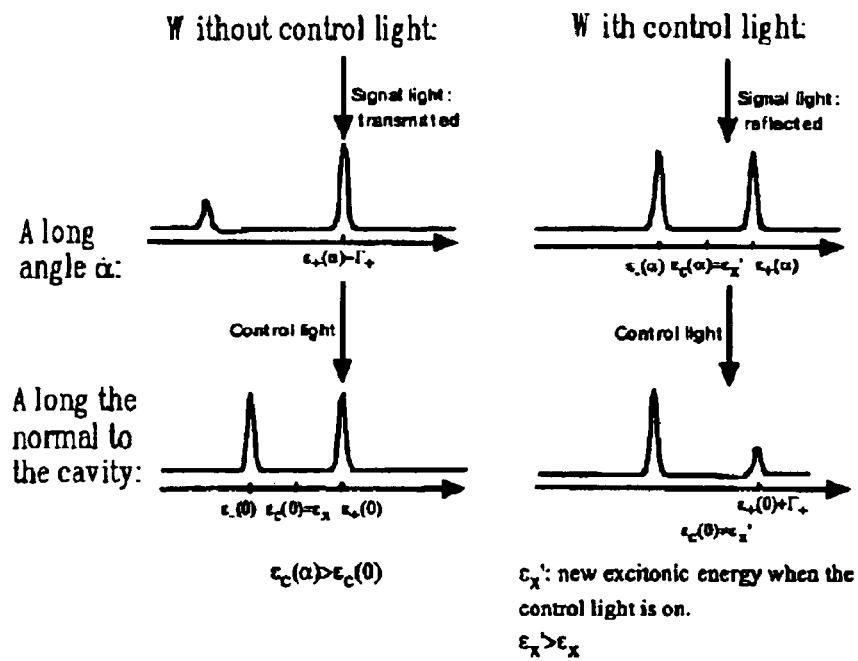
FIG. 15 illustrates the transmission characteristics of another embodiment with a control light incident normally to the microcavity and a signal light incident with an angle α.

FIG. 15 illustrates the transmission characteristics of another embodiment with a control light is incident normally to the microcavity and a signal light incident with an angle $\alpha$. In this aspect of the invention, the signal and the control light have the same wavelength when using different angles. In such a case, the different functionality of the control and signal light will come uniquely from the angle. For example, the same functionality is achieved as in the previous embodiment, but this time the control light is coupled on the upper polariton, and the signal and control light may have substantially the same wavelength. For a good selection of angle and Rabi splitting, $\epsilon_+(0) \approx \epsilon_+(\alpha)-\Gamma_+$.

Figure 16A:
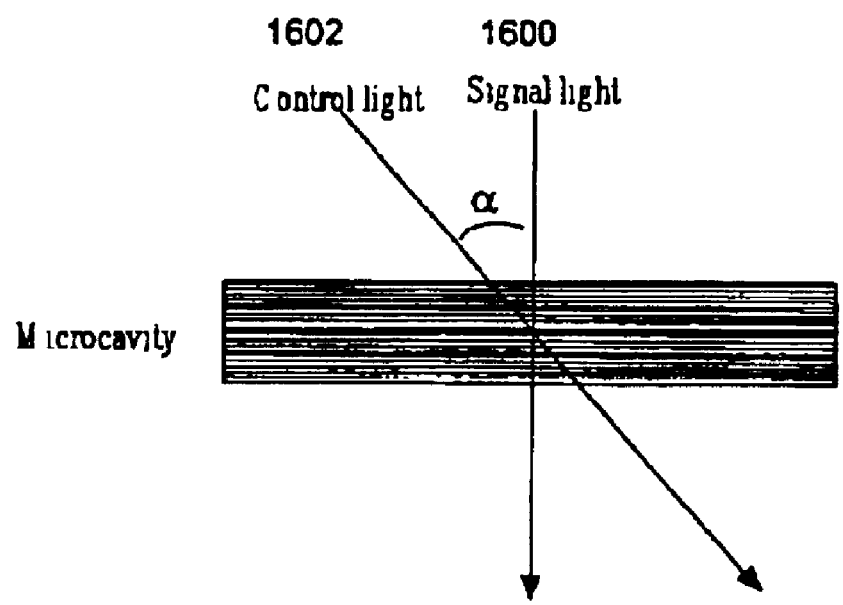
FIGS. 16A–16B illustrate a further embodiment of the invention using a control and signal light at the same wavelength.
Figure 16B:
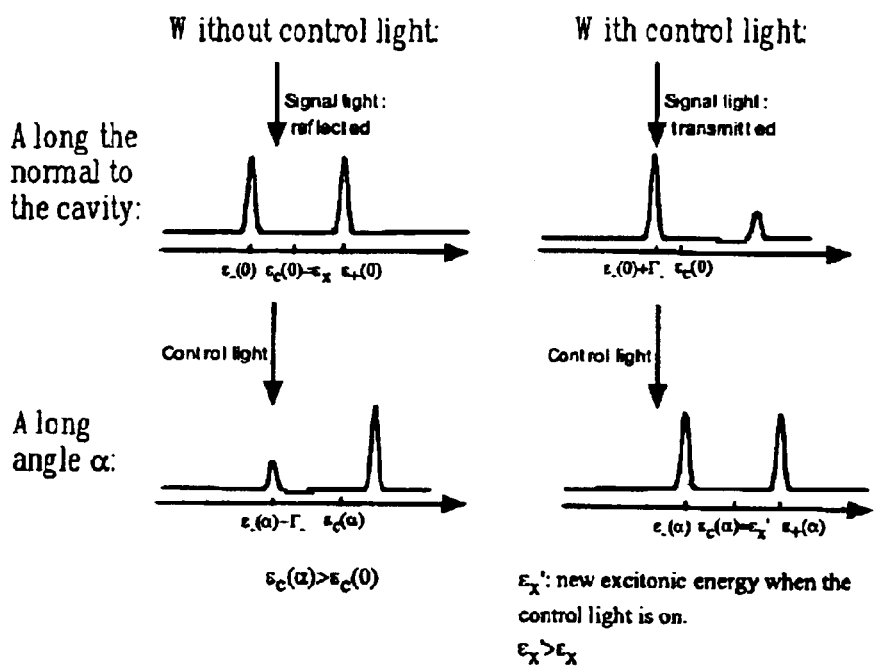

FIGS. 16A–16B illustrate a further embodiment of the invention using a control 1602 and signal 1600 light at the same wavelength. FIG. 16A shows that in this case, the signal 1600 light is incident normally and the control 1602 light is incident at an angle $\alpha$. FIG. 16B illustrates the transmission characteristics of the device. Devices where the control 1602 and signal 1600 light have the same wavelength are important for applications which require optical signal processing without changing the operating wavelength of the system. Also, such devices make it easier to integrate several devices together for more complicated functions. Using a signal 1600 light incident normally to the cavity and the control 1602 light at an angle $\alpha$, the excitonic energy is initially at resonance with the cavity at normal angle ($\epsilon_c(0)=\epsilon_x$). The signal 1600 light photon energy is chosen equal to $\epsilon_-(0)+\Gamma_-$ so that it is detuned from the lower polariton, and is reflected in absence of control 1602 light. For a good choice of angle $\alpha$, the cavity photon at angle $\alpha$ will be initially detuned by $2\Gamma_-$ from the exciton energy ($\epsilon_c(\alpha) \approx \epsilon_x+2\Gamma_-$). Then the position of the lower polariton will be at $\Gamma_-$ below its resonance value (i.e. at $\epsilon_-(\alpha)-\Gamma_-$). The control 1602 light is sent at photon energy $\epsilon_-(\alpha)-\Gamma_-$, so that it couples to the actual position of the lower polariton. In this case, the cavity is initially near, and not at resonance with the exciton for the control 1602 light. Since $\epsilon_-(0)+\Gamma_- \approx \epsilon_-(\alpha)-\Gamma_-$, the control 1602 light and signal 1600 light have the same photon energy. When the control 1602 light is on, the lower polariton will move by its linewidth $\Gamma_-$, (and the exciton moves by $2\Gamma_-$), bringing the cavity at angle $\alpha$ into resonance, and the cavity at the normal angle out-of-resonance. The signal 1600 light will then be transmitted.

Figure 17:
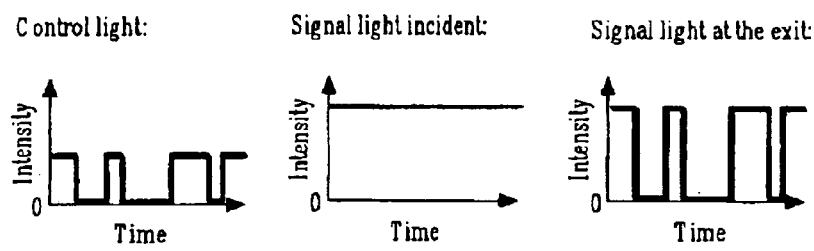
FIG. 17 illustrates a digital signal amplifier of the invention.

FIG. 17 illustrates a digital signal amplifier of the invention. In this embodiment, if a digitally coded signal is used as the "control" light, and a cw light as "signal" light, the signal light at the exit of the cavity will reproduce the time variation of the control light If the cw light has a higher intensity than the control light, an optical digital amplifier is formed. The advantage of such an amplifier as compared to analog amplifiers, such as Erbium-doped fiber amplifiers for example, is that it does not amplify the low level noise, thus yielding a clean signal.

Figure 18:
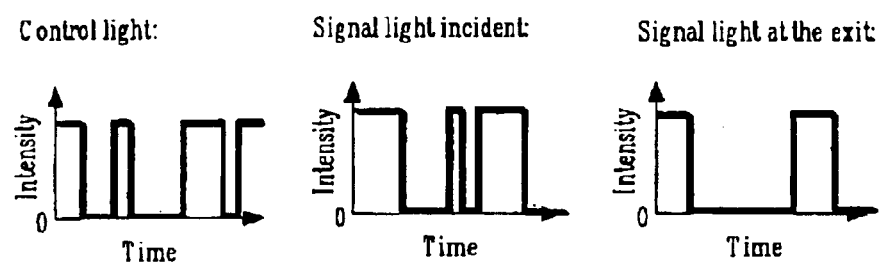
FIG. 18 illustrates an optical logical AND function of the invention.

FIG. 18 illustrates an optical logical AND function of the invention. If both the signal light and the control light are digitally-coded optical signals, the signal light at the exit will be on only when both the control and signal lights are on, i.e. producing a logical AND function.

Figure 19:
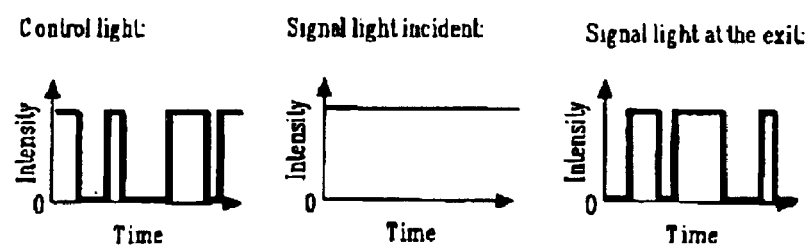
FIG. 19 illustrates a further aspect of the invention using a digitally coded control light and a continuous wave signal light.

FIG. 19 illustrates a digital signal inverter function of the invention using a digitally coded control light and a cw signal light. By using the configuration of FIG. 15 with a "control" light an optical signal digitally coded, and a cw "signal" light, the signal light at the exit of the microcavity will reproduce the digital signal of the control light inverted, i.e. producing a logical NOT function. By combining the logical AND and logical NOT functions, it is possible to reproduce all the boolean logical functions.

In above examples, the "control" light includes in fact the input digital signal while the "signal" light does not include any information since it is cw. The terms "control" and "signal" are not used in relation to their information content, but in relation to the role they play in the device operation. The role of the "control" light is to change the transmission characteristic of the microcavity, therefore it is a light coupled to a polariton, when the cavity is at (or near) resonance with the exciton. The "signal" light is a neutral light on which the control light acts, and that should not modify (or minimally modify) the transmission properties of the cavity. Therefore, it should not be coupled to a polariton in a cavity at (or near) resonance with the exciton.

Polarization presents another design parameter. All the devices based on exciton polaritons conserve the polarization of the incoming light, thus the signal light will have the same polarization at the entrance and the exit of the devices. However, the properties of the microcavity depend on the polarization.

At normal incidence angle, both polarizations are equivalent. When the light is incident with some angle, the cavity photon energy does not only depend on this angle, but also on the polarization of the light. There are two polarizations, s-polarization where the light field is polarized normally to the plane of incidence, and p-polarization where the light field is polarized parallel to the plane of incidence. The cavity photon energy at s-polarization is always smaller than the cavity photon energy at p-polarization (except for normal incidence, where they are equivalent).

The cavity may be placed in resonance with the exciton for s-polarization, and out-of-resonance for p-polarization. For a good choice of the incidence angle a and of the wavelength of the signal light, it is possible to have the signal light reflected when s-polarized, and transmitted when p-polarized. By shifting the exciton energy by exciting the polariton by a control light, the cavity may be placed in resonance with the exciton for p-polarization, and out-of-resonance for s-polarization. Then, the s-polarized part of the signal light will be transmitted, and the p-polarization part will be reflected. Thus, the invention may also be used to produce an optically controlled polarization switch.

Temperature is another design consideration and design parameter. When the temperature of the device is increased, the excitonic linewidth tends to become broader, which results in a broadening of the polaritons. As a result, a larger Rabi splitting (and a smaller carrier separation) is necessary to stay in the strong coupling regime. This results in a smaller optical nonlinearity. This establishes an upper limit on the usable temperature for each system. The calculated example for a GaAs/AlGaAs QW microcavity with a polariton linewidth of 0.1 meV is reasonable for a temperature of 10K. Practically, in a microcavity with a single GaAs/AlGaAs QW (which is the most widely studied configuration), the device can still be implemented with a high switching efficiency up to a temperature of about 120K, at which temperature the polariton linewidth is approximately 0.5 meV. Higher temperatures can be used when multi QWs are used, as the inherent Rabi splitting is larger, but it is unlikely that an efficient device can be realized at room temperature with GaAs QWs. However, there is no fundamental restriction on temperature and it is very likely that the strong coupling regime will be demonstrated at room temperature in different materials, for example in quantum dot systems, which have a sharp excitonic linewidth, or in II–VI semiconductor compounds and organic semiconductors, which have a very large excitonic oscillator strength.

As is shown in the previous analysis, wide quantum wells will yield larger optical nonlinearities, since they can exhibit a larger carrier separation under bias. However, two effects have to be considered.

First, larger spatial separation is accompanied by smaller overlap between the electron and hole wavefunction. Therefore, the bias has to be kept small to stay in the strong coupling regime. This can be somewhat alleviated by combining wavefunction engineering with bias as previously discussed.

Second, the confinement energy of electrons and holes becomes smaller in large QWs. This means that electron and hole energy levels come closer together. When the energy difference between the exciton formed of the ground electron and hole levels and the exciton formed of the next excited electron and hole levels is similar or smaller than the Rabi splitting, there will be interference between the polaritons formed with those two excitons. This will appear as extra peaks in the transmission characteristic of the microcavity and hinder the functioning of the device. This places an upper limit on the thickness of the quantum well. The optimum thickness depends on the polariton linewidth. The smaller the linewidth is, the smaller the Rabi splitting may be; small Rabi splittings allow for wider QWs.

The Q-factor may also be adjusted by design. For example, a high Q-factor (or a sharp cavity linewidth) is realized by increasing the reflectivity of the DBRs cladding the microcavity. A high Q-factor will yield a smaller switching speed, since the light will stay longer in the cavity. However, there are several advantages for the switching efficiency when the Q-factor is high, and practically we want the Q-factor as high as possible:

First, larger bias can be applied while staying in the strong coupling regime when the Q-factor is large, yielding larger optical non linearities. Second, wider quantum wells can be used at high Q-factor, yielding also larger optical nonlinearities. Third, a smaller shift of polariton energy is needed to bring it in or out-of-resonance, yielding again larger optical nonlinearities.

Throughout the specification, the invention is often described with reference to the lower polariton. However, as far as the transmission characteristic is concerned, the same change in transmission can be obtained by coupling the control light on the upper polariton. When the upper polariton is excited, both the lower polariton and the upper one are shifted toward higher energies. Typically, the upper polariton has more dissipation, so that if there is no preference on the wavelength of the light used, the lower polariton may be more advantageous, but the difference is tiny. Also, the shift of the upper polariton is larger than the lower one, so in applications like the saturable transmitter, it may be more advantageous to use the upper polariton as it will yield a lower threshold intensity.

Further, it may be noted that throughout the specification the signal light is often said to be coupled to the cavity photon: it is in fact coupled to $\epsilon_-(\alpha)+\Gamma_-$ or $\epsilon_+(\alpha)-\Gamma_+$, as appropriate. As is understood by those skilled in the art, this is very near to the cavity photon energy when the Rabi splitting is suitably small, which insures also the stability of the transmission characteristics under signal light excitation.

In summary, the invention uses electron-hole spatial separation to enhance field screening effect in an exciton polariton system in the strong coupling regime. The nonlinear excitonic shift allows optically shifting the exciton in and out of resonance with the photon. Since exciton-photon coupling is saturated in the strong coupling regime, it is not injured by the reduction in excitonic oscillator strength in first approximation. The invention uses an excitonic system with a spatial separation as large as possible while staying in the strong coupling regime.

Conclusion

The present invention provides a device and method for gigantic photon-photon interactions. The device comprises an exciton polariton system in the strong coupling regime and excitons with spatially separated electron and hole pairs.

The method comprises providing a signal light to an exciton polariton system in the strong coupling regime and excitons with spatially separated electron and hole pairs, providing a control light to the exciton polariton system and removing the control light.

The foregoing description including the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An optical device, comprising an exciton having spatially separated electron and hole pairs and a photon, wherein the exciton and photon form an exciton polariton system operating in a strong coupling regime and a control light that is coupled to the polariton.

2. The device of claim 1, wherein the exciton polariton system is an upper polariton.

3. The device of claim 1, wherein the exciton polariton system is a lower polariton.

4. The device of claim 1, further comprising a signal light, wherein the control light is incident to the exciton polariton system at an angle $\beta$ and the signal light is incident to the exciton polariton system at angle $\alpha$ and transmission and reflectance of the signal light is controlled by the control light, with $\alpha > \beta$.

5. The device of claim 1, further comprising a signal light, wherein the signal light is incident to the exciton polariton system at an angle β and the control light is incident to the exciton polariton system at angle α and transmission and reflectance of the signal light is controlled by the control light, with α>β.

6. The device of claim 1, further comprising a signal light, wherein the control light is produced by a digitally coded signal and the signal light is a continuous wave light and transmission and reflectance of the signal light is controlled by the control light.

7. The device of claim 1, further comprising a signal light, wherein the control light is a digitally coded signal and the signal light is produced by a digitally coded signal and transmission and reflectance of the signal light is controlled by the control light.

8. The device of claim 1, wherein the exciton polariton system is in a planar microcavity.

9. The device of claim 8, wherein the planar microcavity is formed of a cavity layer clad between distributed Bragg gratings (DBRs).

10. The device of claim 8, wherein the planar microcavity is formed of a cavity layer clad between metallic mirrors.

11. The device of claim 1, wherein the exciton polariton system is embodied in a microcavity pillar.

12. The device of claim 1, wherein the exciton polariton system is embodied in a microdisk.

13. The device of claim 1, wherein the exciton polariton system is embodied in a photonic crystal cavity.

14. The device of claim 1, wherein the exciton polariton system is embodied in a distributed feedback microcavity.

15. The device of claim 14, wherein the distributed feedback microcavity comprises a quantum wire.

16. The device of claim 1, wherein the exciton polariton system comprises a quantum dot.

17. The device of claim 1, wherein the spatially separated electron and hole pairs are separated by an electric field.

18. The device of claim 17, wherein the exciton polariton system is embodied in a quantum well (QW) formed of epitaxial layers and the electric field is applied to the epitaxial layers.

19. The device of claim 17, wherein the exciton polariton system is embodied in a quantum well (QW) formed of epitaixal layers and the electric field is obtained by doping the epitaxial layers.

20. The device of claim 17, further comprising a signal light, wherein transmission and reflectance of the signal light is controlled by the electric field.

21. The device of claim 1, wherein the excitons wish spatially separated electron and hole pairs are separated by a band structure.

22. The device of claim 21, wherein the band structure is an asymmetric quantum well (QW).

23. The device of claim 21, wherein the band structure is formed by type II semiconductors.

24. The device of claim 1, wherein the exciton polariton system is embodied in a symmetric microcavity with a biased quantum well (QW) including a cavity photon having an energy and a biased exciton having an energy and wherein the cavity photon energy and the biased exciton energy are substantially in resonance.

25. The device of claim 1, wherein the device is a wavelength converter having an input light tuned on a lower polariton energy of the exciton polariton system.

26. The device of claim 1, wherein the device is a saturable mirror wherein an incident light on a cavity line of the exciton polariton system is reflected when it is out of resonance with the polariton and is transmitted when a power of the incident light is large.

27. The device of claim 1, wherein the device is a low-power saturable transmitter wherein an incident light on the polariton of the exciton polariton system is transmitted when it is in resonance with the polariton and is reflected when a power of the incident light is large.

28. The device of claim 1, wherein the device is a photon turnstile wherein a cavity of the exciton polariton system is driven with a pulsed laser.

29. A method of controlling photon transmission, comprising:
  providing a signal light to an exciton polariton system in a strong coupling regime and excitons with spatially separated electron and hole pairs; and
  providing and removing a control light to the exciton polariton system to control the signal light.

30. The method of claim 29, wherein providing and removing the control light controls transmission and reflectance of the signal light.

31. The method of claim 29, wherein providing and removing the control light controls a phase shift of the signal light.

32. The method of claim 29, wherein the exciton polariton system includes a polariton and the control light is coupled to the polariton.

33. The method of claim 32, wherein the polariton is an upper polariton.

34. The method of claim 32, wherein the polariton is a lower polariton.

35. The method of claim 32, wherein the control light is incident to the exciton polariton system at angle β and the signal light is incident to the exciton polariton system at angle α, with α>β.

36. The method of claim 32, wherein the signal light is incident to the exciton polariton system at angle β and the control light is incident to the exciton polariton system at angle α, with α>β.

37. The method of claim 32, wherein the control light is produced by a digitally coded signal and the signal light is a continuous wave light.

38. The method of claim 32, wherein the control light is a digitally coded signal and the signal light is produced by a digitally coded signal.

39. The method of claim 29, wherein the exciton polariton system is in a planar microcavity.

40. The method of claim 39, wherein planar microcavity is formed of a cavity layer clad between distributed Bragg reflectors (DBRs).

41. The method of claim 39, wherein the planar microcavity is formed of a cavity layer clad between metallic mirrors.

42. The method of claim 29, wherein the exciton polariton system is embodied in a microcavity pillar.

43. The method of claim 29, wherein the exciton polariton system is embodied in a microdisk.

44. The method of claim 29, wherein the exciton polariton system is embodied in a photonic crystal cavity.

45. The method of claim 29, wherein the exciton polariton system is embodied in a distributed feedback microcavity.

46. The method of claim 45, wherein the distributed feedback microcavity comprises a quantum wire.

47. The method of claim 29, wherein the exciton polariton system comprises a quantum dot.

48. The method of claim 29, wherein the spatially separated electron and hole pairs are separated by electric field.

49. The method of claim 48, wherein the exciton polariton system is embodied in a quantum well (QW) and epitaxial layers and the electric field is applied to the epitaxial layers.

50. The method of claim 48, wherein the exciton polariton system is embodied in a quantum well (QW) and epitaxial layers and the electric field is obtained by doping the epitaxial layers.

51. The method of claim 48, further comprising a signal light, wherein transmission and reflectance of the signal light is controlled by the electric field.

52. The method of claim 29, wherein the excitons with spatially separated electron and hole pairs are separated by a band structure.

53. The method of claim 51, wherein the band structure is an asymmetric quantum well (QW).

54. The method of claim 51, wherein the band structure is formed by type II semiconductors.

55. The method of claim 29, wherein the exciton polariton system is embodied in a symmetric microcavity with biased quantum wells (QW) including a cavity photon having an energy and a biased exciton having an energy and wherein the cavity photon energy and the biased exciton energy are substantially in resonance.

56. The method of claim 29, wherein the exciton polariton system has an input light tuned on a lower polariton energy of the exciton polariton system.

57. The method of claim 29, wherein an incident light on a cavity line of the exciton polariton system is reflected when the polariton is out of resonance with the incident light and is transmitted when a power of the incident light is large.

58. The method of claim 29, wherein an incident light on a polariton line of the exciton polariton system is transmitted when the polariton is in resonance with the incident light and is reflected when a power of the incident light is large.

59. The method of claim 29, further comprising driving a cavity of the exciton polariton system with a pulsed laser.

* * * * *

UNITED STATES PATENT AND TRADEMARK OFFICE
CERTIFICATE OF CORRECTION

PATENT NO. : 6,768,131 B2
DATED : July 27, 2004
INVENTOR(S) : Mathilde Rufenacht It is certified that error appears in the above-identified patent and that said Letters Patent is hereby corrected as shown below:

Title page,
Item [56], References Cited, OTHER PUBLICATIONS,
"Heavy-Hole", reference, "Excitions" should read -- Excitons --.
"Elias", reference, "Burnstein" should read -- Burstein --.

Column 17,
Line 49, "wish" should read -- with --.

Signed and Sealed this

Fifteenth Day of February, 2005

JON W. DUDAS
*Director of the United States Patent and Trademark Office*